United States Patent

Muegge et al.

[11] 4,227,064
[45] Oct. 7, 1980

[54] DEVICE FOR ADVANCING A WORKPIECE IN ELECTRO-EROSIVE PROCESSING BY A WIRE-LIKE ELECTRODE

[75] Inventors: Harry Muegge; Klaus-Peter Steil, both of Munich, Fed. Rep. of Germany

[73] Assignee: Siemens Aktiengesellschaft, Berlin & Munich, Fed. Rep. of Germany

[21] Appl. No.: 968,171

[22] Filed: Dec. 11, 1978

[30] Foreign Application Priority Data

Dec. 14, 1977 [DE] Fed. Rep. of Germany ....... 2755724

[51] Int. Cl.² .............................................. B23P 1/12
[52] U.S. Cl. .................................. 219/69 W; 269/58
[58] Field of Search ............... 219/69 W, 69 M, 69 R, 219/69 E; 83/414, 412, 409, 410, 171, 172; 269/58, 71

[56] References Cited

U.S. PATENT DOCUMENTS

| | | | |
|---|---|---|---|
| 3,035,150 | 5/1962 | Connoy | 219/69 W |
| 3,943,322 | 3/1976 | Lehmann et al. | 219/69 E |
| 4,123,645 | 10/1978 | Shichida et al. | 219/69 W |

Primary Examiner—B. A. Reynolds
Assistant Examiner—Clifford C. Shaw
Attorney, Agent, or Firm—Hill, Van Santen, Steadman, Chiara & Simpson

[57] ABSTRACT

A device is disclosed for advancing a workpiece in automatic processing by a wire erosion machine. A part of the workpiece which is not to be processed is clamped to a clamp bearing at a cross-coordinate point. The part of the workpiece which is to be processed rests on a bearing table which is displaceable in two directions of movement. The bearing table, which possesses the same height as the clamp bearing, is provided with a slot through which the electrode can be passed. In the one direction of movement the bearing table is moved by the support, whereas in the other direction of movement the support slides along one side of the bearing table and the workpiece slides along the bearing table.

9 Claims, 1 Drawing Figure

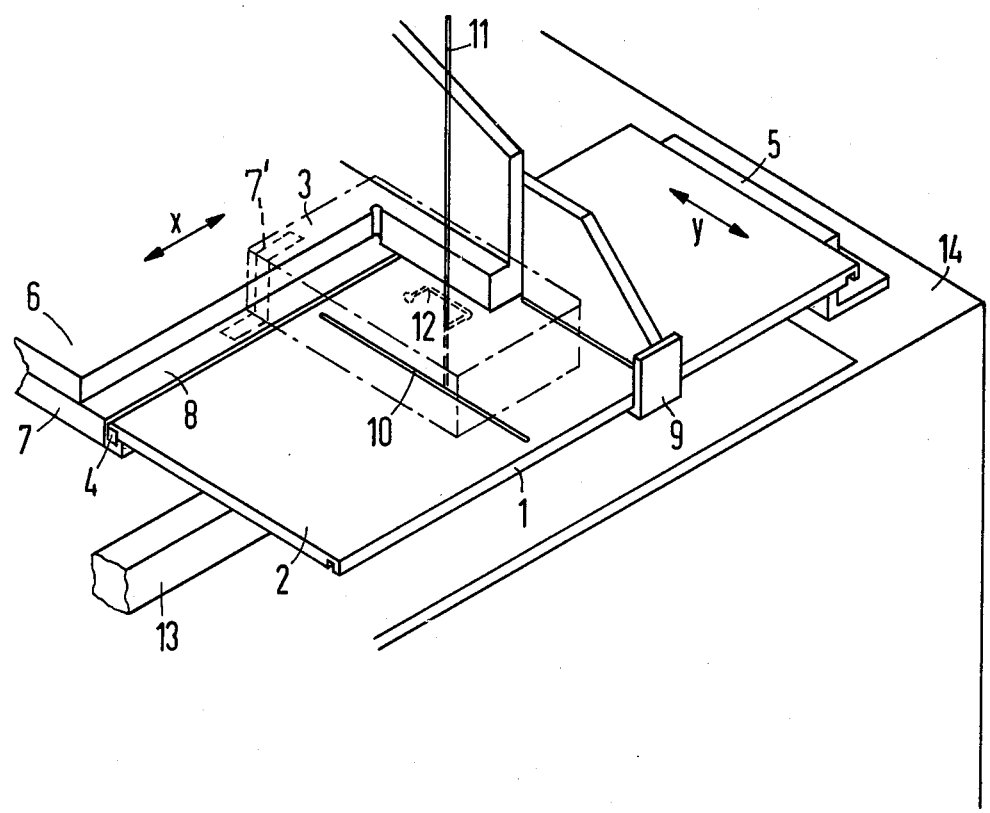

DEVICE FOR ADVANCING A WORKPIECE IN ELECTRO-EROSIVE PROCESSING BY A WIRE-LIKE ELECTRODE

BACKGROUND OF THE INVENTION

The subject of the invention is a device for advancing the workpiece in an electro-erosive processing by a wire-like electrode which is threaded into a starting bore in the workpiece and is drawn through by the drive and guide system. A path of the relative movements between the workpiece and the electrode is controlled by means of an electric control system. The workpiece is fixed at a portion of the workpiece which is not to be processed to a cross-coordinate support which can be moved in both directions of movement on a clamp bearing.

Wire erosion machines, in particular those which are numerically controlled, can be used with great advantage for cutting complicated outer or inner contours on electrically conductive workpieces. As is known, during the processing operation, wire-like or strip-like electrodes and workpieces move relative to one another. The electrode is drawn off from a feed roller, moves past the workpiece which is to be processed, and passes to a drive device which consists of a pair of rollers which impart a uniform forwards motion to the electrode. Finally, the electrode is rewound onto a roller or chopped into small pieces which fall into a collector container. A sensor which is arranged between the feed rollers and workpiece checks for the presence of a slight mechanical tensile stress in the electrode. If the tensile stress is not present due to a disturbance, the sensor instigates the disconnection of the electrical voltage which produces the erosion sparks, and halts the numerical control and the advance of the electrode.

For the relative movement between workpiece and electrode, the workpiece together with the component which is not to be processed is clamped to a cross-coordinate support. The electrode is threaded through a starting bore in the workpiece and drawn through by the drive and guide system arranged following the workpiece. The movements of the support and thus of the workpiece in the two horizontal directions of movement are triggered by the electrical control system which is fed with the program for the contour to be processed in the workpiece via a punched strip. The workpiece which is to be processed consists of a plate or of a stack of plates arranged one above another from which the programmed contours are cut out by spark erosion using a wire-like copper electrode. The known feed device used in commercially available wire erosion machines has the disadvantage that during the last cutting phase of a contour, the material which has been cut out is bent downwards on account of its weight and becomes twisted. This results in penetration points on the workpiece, short circuits and occasionally the breaking off of the electrode. The workpiece is then unserviceable. In the event of a short-circuit, automatic further erosion of the contour is impossible. An operator must monitor the last cutting phase of each contour during the erosion.

SUMMARY OF THE INVENTION

An object of the invention is to provide a device for advancing the workpiece during electro-erosive processing by means of a wire-like electrode, wherein tilting of the eroded material and the associated penetration points and short-circuits are avoided during the erosion process.

According to the invention, a bearing table is provided which has one sliding bearing for feed in each of the two coordinate directions, and the part of the workpiece which is to be processed rests on the bearing surface of the bearing table. One sliding bearing for one direction of movement is secured to the base of the machine, and the other sliding bearing for the other direction of movement is arranged on the cross-support in such manner that the cross-support and the bearing table can be displaced in parallel relative to one another. The bearing surface of the bearing table possesses the smae height as the bearing surface of the clamp bearing, and the bearing surface is provided with a slot through which the wire-like electrode can be moved and which runs in the direction of movement of the sliding bearing secured to the base of the machine.

The new device has the advantage that the eroded workpiece component is prevented from falling out or bending over. No penetration points or short-circuits occur. This advantage is particularly noticeable in the case of very thick workpieces. Monitoring of the last cutting phase by an operator can be dispensed with since the device operates reliably. Each contour is automatically finished cut. Consequently the device is suitable for automatic positioning and threading of the wire-like electrode into the starting bore of the next contour. The device allows the automatic finished erosion of the workpieces possessing a plurality of openings, bores and outer contours. The cutting process can be continued without an operator at night and on weekends without interruption. The new device is designed in such a way that it can be subsequently installed in known commercially available wire erosion machines in a simple manner since the bearing table merely needs to be connected in a mobile fashion to the crosscoordinate support.

Details of the invention will be given in the form of an advantageous exemplary embodiment which is illustrated in the Figure. The illustration has been partially simplified. Thus particular structural details of the wire erosion machine with which the expert will be familiar and which are not closely related to the invention have been omitted for reasons of simplification and clarity.

BRIEF DESCRIPTION OF THE DRAWING

The FIGURE illustrates in a perspective view the feed device for the workpiece according to the invention.

DESCRIPTION OF THE PREFERRED EMBODIMENT

The feed device consists of a bearing table 1 having a bearing surface 2 which is arranged immediately below the workpiece 3 which has been shown in dash-dotted fashion. The bearing table possesses two longitudinal guides 4 and 5 which are advantageously in the form of sliding bearings. The sliding bearing 4 allows the bearing surface 2 to be displaced in the X-direction whereas the sliding bearing 5 allows it to be displaced in the Y-direction. The sliding bearing 4 is arranged on the cross-coordinate support 6 which has been only partially illustrated. A clamp bearing 7 with a bearing surface 8 is firmly attached to the support 6. The bearing surface 8 of the clamp bearing 7 and the bearing surface 2 of the bearing table are arranged in one plane. That part of the workpiece 3 which is not to be processed rests on the bearing surface 8 of the clamp bearing 7 and is clamped to a clamping device which is known per se arranged on the support and shown at 7' dotted lines in the drawing. As a result, that part of the workpiece which is to be processed comes to lie on the bearing surface 2 of the table 1. The sliding bearing 4 is attached to the clamp bearing 7 of the support 6. A counter bearing 9 which likewise consists of a sliding bearing parallel to bearing 4 serves to guide and support the bearing table 1 in a stable fashion across from bearing 4. The sliding bearing 5 which is secured to the machine base 14 allows the table 1 with the workpiece 3 and cross-coordinate support 6 to move in the Y-direction. The wire electrode 11 is drawn through a slot 10 in the table 1 and cuts out the contour 12 in the workpiece. The wire electrode is fed across a guide arm 13 at the feed side, is discharged behind the workpiece at the delivery side, is wound onto a roller or cut into small pieces and collected in a collector container. The width of the slot 10 somewhat exceeds the diameter of the wire-electrode 11. Since the bearing table with the workpiece and the support moves in the Y-direction, during the processing of the workpiece the electrode moves back and forth in the slot 10. In the X-direction, the support, with the attached workpiece, moves along the bearing table in the sliding bearing 4. Consequently the workpiece 3 slides over the bearing surface 2.

To enable the workpiece to slide over the bearing surface 2 with a low friction resistance, it is advantageous to coat the bearing surface with a synthetic layer, for example, Teflon. This can also be advantageously effected in the sliding bearings.

At the end of the erosion process of the workpiece, the sliding bearing 5 can be moved and, the bearing table 2 can be withdrawn from the sliding bearing 4, and the workpiece 3 and the remaining parts of the eroded bores can be withdrawn. Following the withdrawal of the workpiece components, the table is reinserted into the sliding bearing 4 and the sliding bearing 5 is fixed, for example, with the aid of two screws.

The program which has been input into the control system is advantageously designed such that the last cut takes place as far as possible in the Y-direction. As the table together with the workpiece moves in the Y-direction, displacement of the eroded part in the workpiece is avoided.

Although various minor modifications may be suggested by those versed in he art, it should be understood that we wish to embody within the scope of the patent warranted hereon, all such embodiments as reasonably and properly come within the scope of our contribution to the art.

We claim as our invention:

1. A device for advancing a workpiece in an electro-erosive processing by a wire-like electrode which is threaded into a starting bore in the workpiece and is drawn through by a drive and guide system and wherein a path of the relative movements between the workpiece and the electrode is controlled by means of an electric control system, comprising: a base; means for fixing a portion of the workpiece which is not to be processed to a cross-coordinate support which can be moved in all lateral directions by use of an attached clamp bearing having a bearing surface on which the workpiece rests; a bearing table having two sliding bearings, one for advance in each of two orthogonal coordinate directions; a portion of the workpiece which is to be processed resting on a bearing surface of the bearing table; one of said sliding bearings being secured to the base and the other sliding bearing connected to the cross-coordinate support via the clamp bearing such that the cross-coordinate support and the bearing table are displaceable in parallel relative to one another and the bearing surface of the bearing table has the same height as the bearing surface of the clamp bearing; and that the bearing surface of the bearing table is provided with a slot means for movement of the wire-like electrode, said slot means extending longitudinally in a direction of movement of the sliding bearing secured to the base.

2. A device as claimed in claim 1 wherein the bearing surface of the bearing table is coated with a synthetic layer means for facilitating sliding movement of the workpiece.

3. A device as claimed in claim 1 wherein both sliding bearings are coated with a synthetic layer.

4. A device as claimed in claim 3 wherein the synthetic layer comprises Teflon.

5. A device as claimed in claim 1 wherein a further sliding bearing as a supporting counter bearing is provided which is positioned to guide further and support the bearing table across from said other sliding bearing and which is arranged on the cross-coordinate support.

6. A device as claimed in claim 1 wherein both sliding bearings are longitudinal guides.

7. An electro-erosive process worktable for advancing a workpiece in an electro-erosive process utilizing an erosive electrode, comprising:
   a base having a first slide bearing attached thereto;
   a clamp bearing means having a bearing surface and means for securing a portion of the workpiece not to be processed to the bearing surface.
   a second slide bearing arranged orthogonal to the first bearing and attached to the clamp bearing means;
   a bearing table having a workpiece bearing surface means for supporting portions of the workpiece to be processed, said bearing table having slot means for receiving the electrode, said bearing table being slidably supported by and attached to said first and second slide bearings; and
   said clamp bearing means being displaceable in all planar directions and said bearing table being displaceable during operation only along the first slide bearing.

8. The worktable of claim 7 wherein the slot means extends longitudinally in a direction parallel to the first slide bearing.

9. The worktable of claim 7 wherein means are provided for supporting and moving the clamp bearing means relative to the base.

* * * * *